(12) United States Patent
Groll (10) Patent No.: US 9,756,979 B2
(45) Date of Patent: Sep. 12, 2017

(54) POT WITH BAIL HANDLE AND TILTABLE LID

(71) Applicant: All-Clad Metalcrafters LLC, Cannonsburg, PA (US)

(72) Inventor: William A. Groll, McMurray, PA (US)

(73) Assignee: All-Clad Metalcrafters LLC, Canonsburg, PA (US)

( * ) Notice: Subject to any disclaimer, the term of this patent is extended or adjusted under 35 U.S.C. 154(b) by 24 days.

(21) Appl. No.: 13/646,772

(22) Filed: Oct. 8, 2012

(65) Prior Publication Data

US 2013/0119069 A1  May 16, 2013

Related U.S. Application Data

(60) Provisional application No. 61/544,295, filed on Oct. 7, 2011.

(51) Int. Cl.
*A47J 36/08* (2006.01)
*A47J 45/06* (2006.01)
*A47J 36/12* (2006.01)

(52) U.S. Cl.
CPC .............. *A47J 36/08* (2013.01); *A47J 36/12* (2013.01); *A47J 45/065* (2013.01)

(58) Field of Classification Search
CPC .. A47J 36/08; A47J 36/12; A47J 36/06; A47J 45/065; A47J 45/075; B65D 23/108; B65D 25/2835; B65D 25/2838; B65D 25/2855; B65D 25/32

USPC ............... 220/912, 760, 773–774, 769, 765
See application file for complete search history.

(56) References Cited

U.S. PATENT DOCUMENTS

| 218,304 | A | * | 8/1879 | Morgan | 220/317 |
| 478,376 | A | * | 7/1892 | Smith | A47J 27/04 |
| | | | | | 126/369 |
| 770,208 | A | * | 9/1904 | Williams | 220/765 |
| 1,408,410 | A | * | 2/1922 | Sidle | 222/466 |
| 1,987,492 | A | * | 1/1935 | Reynolds | A47J 45/065 |
| | | | | | 220/318 |
| 2,879,916 | A | * | 3/1959 | Hoffmann et al. | 220/322 |
| 3,015,412 | A | * | 1/1962 | Klages | 220/751 |
| 5,637,420 | A | * | 6/1997 | Jones, Jr. | H01M 2/1072 |
| | | | | | 16/DIG. 15 |

* cited by examiner

*Primary Examiner* — Robert Poon
(74) *Attorney, Agent, or Firm* — The Webb Law Firm (57) ABSTRACT

A device for holding a lid to a pot to permit the pouring of liquid from the pot while retaining a food product within the pot, including a pair of spaced apart hook members attached to opposed top edges of the pot and positioned off-set from a centerline of the pot. The hook members each include a horizontal top flange turned inwardly toward the pot, whereby when the pot is moved to a pouring position, the liquid forces the lid to separate from the pot and the top flanges of the hook members to engage the lid to maintain a predetermined pouring gap between the lid and the pot and also to prevent the lid from sliding forward off the pot due to their off-set positioning from the pot centerline.

11 Claims, 6 Drawing Sheets

POT WITH BAIL HANDLE AND TILTABLE LID

CROSS REFERENCE TO RELATED APPLICATION

This application is based upon U.S. Provisional Patent Application No. 61/544,295 filed Oct. 7, 2011, entitled "Pot With Bail Handle and Tiltable Lid", which is incorporated by reference herein in its entirety.

BACKGROUND OF THE INVENTION

Field of the Invention

The present invention relates generally to a pot having a lid and a clamp for holding the lid on the pot, and more particularly, to a pot with a bail handle, a clamp, and a tillable lid which allows for the drainage of liquid from the pot while retaining a food product therein.

Description of Related Art

When cooking a food product within a liquid, such as boiling potatoes, it is often necessary to drain the hot water or liquid from the food product before emptying the contents from the container. However, the simple act of straining the food has various hazards. One hazard is the risk of burns to the person straining the food product. If a separate strainer in not employed, the person straining the food typically holds the edges of the lid to the pot surface while concurrently holding the handles, and then tilts the pot to pour off the hot liquid. This act exposes the user's hands and arms to hot water or liquid and steam, which can result in burns. Another hazard is the risk of the user accidentally touching a hot portion of the pot or splashing the hot liquid onto oneself. Another difficulty when straining the food product is that it is difficult for the user to manipulate the pot in this position while keeping the lid in place. This is especially true for a larger or heavier pot. Oftentimes, the lid can slip off the top of the pot, spilling the food product.

Therefore, a new and more efficient, safer, and ergonomically designed assembly to allow for the drainage of liquid from a pot while retaining a food product therein, is sought.

SUMMARY OF THE INVENTION

According to a first aspect, the present invention is directed to a device for holding a lid to a pot to permit the pouring of liquid from the pot while retaining a food product within the pot. The device comprises a pair of spaced apart hook members attached to opposed top edges of the pot and positioned off-set from a centerline of the pot. Each of the hook members include a horizontal top flange turned inwardly toward the pot, whereby when the pot is moved to a pouring position, the liquid forces the lid to separate from the pot and the top flanges of the hook members to engage the lid to maintain a predetermined pouring gap between the lid and the pot. The hook members also prevent the lid from sliding forward off the pot due to their off-set positioning from the pot centerline. The device further includes a bail handle pivotally attached to opposed sidewalls of the pot and positioned off-set from the centerline of the pot to provide a preferential pouring orientation for the pot. The spaced apart hook members define a diameter which is less than a pot diameter and less than a lid diameter so as to prevent the lid from sliding forward off the pot when the pot is positioned in the preferential pouring orientation. The spaced apart hook members can have a C-shaped design configured for receiving an edge portion of the lid. This C-shaped design includes a vertical portion having a height sufficient to define a controlled pouring gap and wherein the horizontal top flange contacts a top portion of the lid to maintain the predetermined pouring gap between the lid and the pot when the pot is moved to the pouring position and liquid is flowing through the gap. A pair of opposed handle hinges is provided on the pot for securing the bail handle to the opposed sidewalls of the pot. The handle hinges include a ledge for cooperating with opposed handle ends wherein the handle ends include a first radiused edge and a second square edge. The first radiused edge cooperates with the hinge ledge to enable the handle to pivot in a first direction with respect to the pot. The second square edge cooperates with the hinge ledge to form a stop to prevent the handle from pivoting in a second direction with respect to the pot. This provides an added safety feature as this stop limits the pivotal rotation of the bail handle to 90° and thus, the handle cannot over-rotate and risk spilling the pot contents onto the user. The hook members can be integrally formed with the handle hinges. The pot can include a second handle positioned on a sidewall portion thereof to assist the user with manipulation of the pot during pouring. According to one design, the bail handle is positioned off-set from the centerline of the pot in an amount of approximately 0.25 inches.

According to a second aspect, the present invention is directed to a device for holding a lid to a pot to permit the pouring of liquid from the pot while retaining a food product within the pot. The device comprises an elongated member having opposed hook members configured for cooperating with opposed handle ends attached to opposed sidewalls of the pot such that the elongated member extends across a top portion of the lid. The opposed handle ends are located off-set from a centerline of the pot. The elongated member includes a laterally extending member configured for contacting the lid whereby when the pot is moved to a pouring position, the liquid forces the lid to separate from the pot and the laterally extending member engages the lid to maintain a predetermined pouring gap between the lid and the pot and also to prevent the lid from sliding forward off the pot due to its off-set positioning from the pot centerline.

According to a third aspect, the present invention is directed to a pot assembly for pouring of liquid from the pot while retaining a food product therein. The pot assembly comprises a pot having a closed bottom, an open top, and a sidewall extending between the bottom and the top. The pot is configured for holding a predetermined amount of food product and liquid. The assembly further includes a lid positioned adjacent the open top of the pot. A pair of spaced apart hook members is attached to opposed top edges of the pot adjacent the open top. The pair of spaced apart hook members is positioned at a location off-set from a centerline of the pot. These hook members are configured to engage the lid and maintain a predetermined gap between the open top portion and the lid upon movement of the pot to a pouring position. The assembly also includes a bail handle pivotally attached to the opposed top edges of the pot and positioned off-set from the centerline of the pot to provide a preferential pouring orientation for the pot, whereby movement of the pot to the pouring position causes any liquid contained within the pot to force the lid to separate from the open top of the container to permit the pouring of liquid from the pot while retaining a food product within the pot. The hook members are configured to prevent the lid from sliding forward off the pot due to their off-set positioning from the pot centerline. Each of the hook members are configured to receive a portion of the lid therein and include a horizontal top flange turned inwardly toward the pot and a vertical portion to define a controlled gap, whereby when the pot is moved to the pouring position, the liquid forces the lid to separate from the pot and the top flanges of the hook members to engage the lid to maintain the predetermined pouring gap between the lid and the pot and also to prevent the lid from sliding forward off the pot due to their off-set positioning from the pot centerline. According to one embodiment, a pair of handle hinges can be provided for pivotally attaching the bail handle to opposed sidewalls of the pot and the opposed hook members can be integrally formed with the handle hinges. According to one design, the bail handle can be positioned off-set from the centerline of the pot in an amount of approximately 0.25 inches and can have a 90° pivotal rotation limit from a horizontal to a vertical position.

These and other features and characteristics of the present invention, as well as the methods of operation and functions of the related elements of structures and the combination of parts and economies of manufacture, will become more apparent upon consideration of the following description with reference to the accompanying drawings, all of which form a part of this specification, wherein like reference numerals designate corresponding parts in the various figures.

DETAILED DESCRIPTION OF THE INVENTION

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific components illustrated in the attached drawings, and described in the following specification, are simply exemplary embodiments of the invention. Hence, specific dimensions and other physical characteristics related to the embodiments disclosed herein are not to be considered as limiting.

Reference is now made to FIGS. 1, 2A, 3-4 and 5A-5D, which show a device, generally indicated as 10, for holding a lid 12 to a pot 14 according to an embodiment of the present invention to permit the pouring or straining of liquid from the pot 14 while retaining a food product within the pot 14. This device can be used with any type of well-known cooking pot. One example of cookware or cooking pot that can be used with the present invention is of a type formed from a multi-layered, composite bonded metal product which can be formed of a variety of metals, most commonly aluminum and/or copper for good heat conductivity along with outer layers of stainless steel for appearance, wear resistance and corrosion resistance. Other types of materials known to form cookware is a layer of a ferro-magnetic material, such as carbon steel or a 400 series ferritic stainless steel in place of the more common 300 series austenitic stainless steel if the cookware is to be used on an induction cooking device. All of these combinations are disclosed in the prior art as taught, for example, in Ulam, U.S. Pat. No. 4,646,935; in Groll, U.S. Pat. No. 6,267,830; in Groll, U.S. Pat. No. 6,926,971 and in Groll, U.S. Pat. No. 7,960,034, all of which are incorporated by reference herein.

Figure 3:
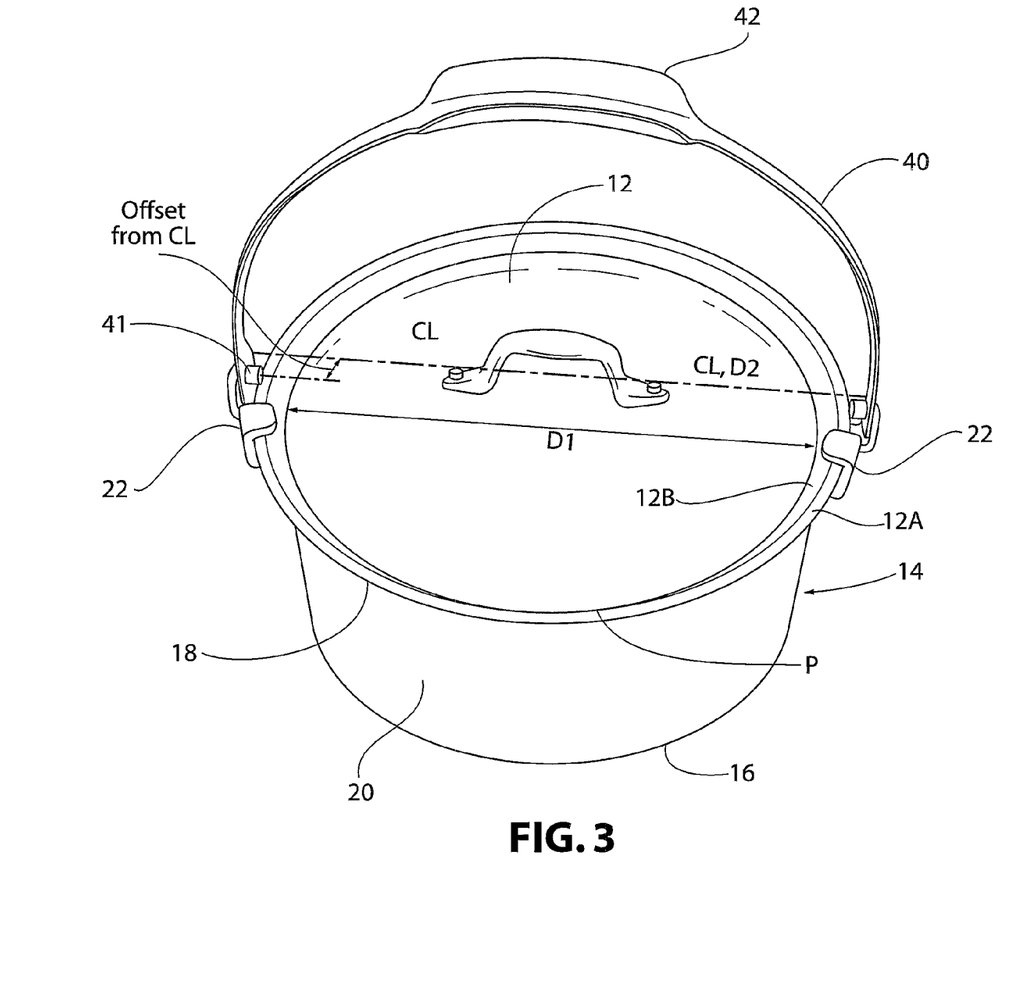
FIG. 3 is a top front perspective view of the pot, handle and device of FIG. 1 positioned on a pot in accordance with an embodiment of the present invention.

With particular reference to FIG. 3, the pot 14 can include a closed bottom 16, an open top 18, and a sidewall 20 extending between the bottom 16 and top 18. The pot 14 is configured for holding a predetermined amount of food product and/or liquid and the lid 12 is positioned adjacent the open top 18 of the pot 14. The pot can also include a bail handle 40 for lifting and handling the pot 14.

With continuing reference to FIGS. 1, 2A, 3-4, and 5A-5D, the device 10 comprises a pair of spaced apart hook members 22. These hook members 22 can be attached to opposed top edge sidewall portions 24 of the pot 14 at a location that is positioned off-set from a centerline "CL" of the pot 14. Each of the hook members 22 include a horizontal top flange 26 when the hook members 22 are attached to the pot 14, the horizontal top flanges 26 are turned inwardly toward the pot 14. When a user moves the pot 14 to a pouring position, such as by tilting the pot 14 to strain or pour off the liquid from the food product located therein, any liquid located within the pot 14 forces the lid 12 to separate from the open top 18 of the pot 14. This causes the top flanges 26 of the hook members 22 to engage the lid 12 to maintain a predetermined pouring gap between the lid 12 and the top edge 18 of pot 14. The hook members 22 also prevent the lid 12 from sliding forward off the pot 14 due to their off-set positioning from the pot centerline "CL". In such an off-set positioning, the distance D1 between the pair of hooks 22 as measured across the pot 14 is less than a diameter D2 of the lid 12.

According to one embodiment, each of hook members 22 can be integrally formed with a bracket member 25. The bracket member 25 includes an upwardly extending tab 27 and a downwardly depending flange 29 for respective attachment to the bail handle 40 and pot sidewall 24 via rivet holes 27' and 29' as shown in FIGS. 5A-5D.

The bail handle 40 can be pivotally attached, such as with a weld rivet 41 placed in rivet holes 27' in tab 27 and through hole 40' in handle 40 or any other well-known attachment member, to the opposed top edge sidewall portions 24 of the pot 14. According to one embodiment, the bail handle 40 can be positioned off-set from the centerline "CL" of the pot 14 toward the pouring edge "P" to provide a preferential pouring orientation for the pot 14. As discussed above and shown in FIGS. 3 and 4, the spaced apart hook members 22 define a diameter "D1" which is less than a pot diameter and a lid diameter "D2" so as to prevent the lid 12 from sliding forward off the pot 14 when the pot 14 is positioned in the preferential pouring orientation. The bail handle 40 can include a hand grip 42 to assist with handling the pot 14.

Figure 1:
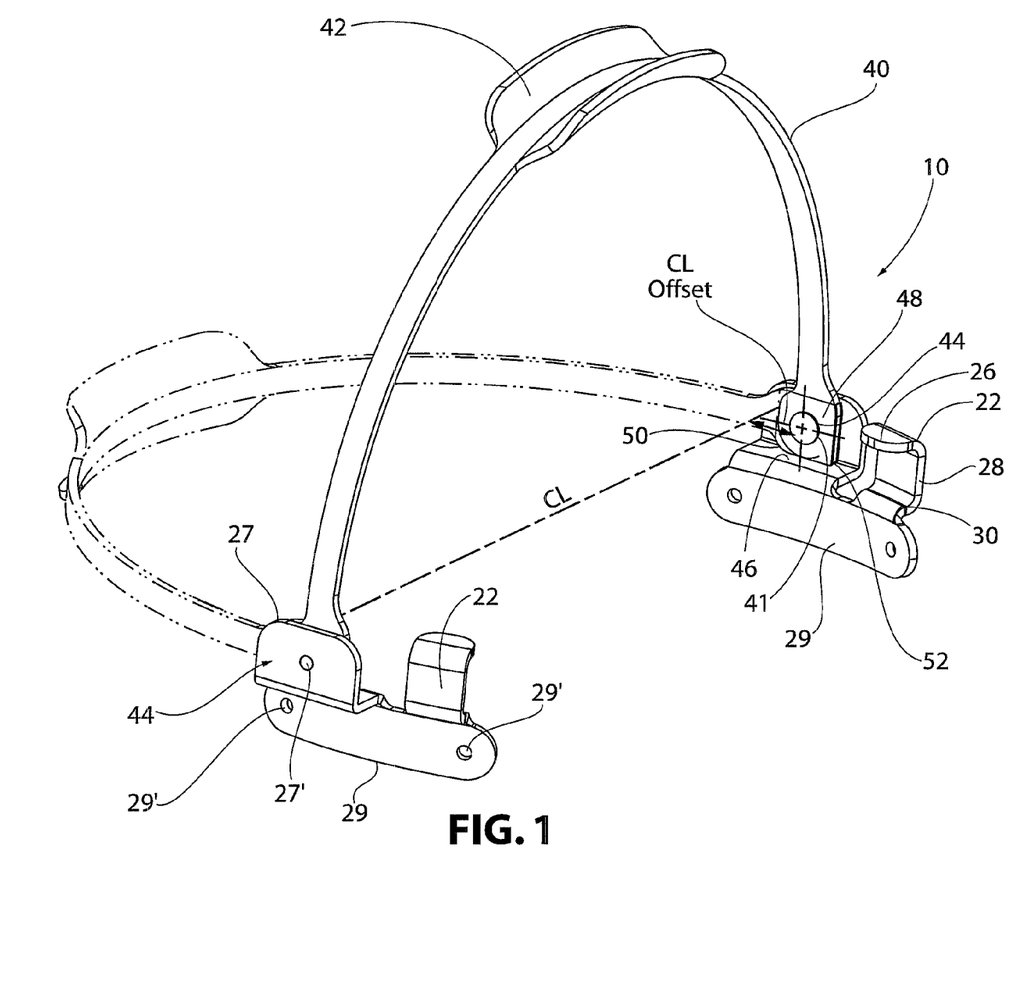
FIG. 1 is a perspective view of a bail handle and a combined hinge and lid retaining device for holding a lid to a pot in accordance with an embodiment of the present invention.

With particular reference to FIGS. 3 and 5A-5D, the spaced apart hook members 22 can have a C-shaped design configured for receiving an edge portion 12A of the lid 12 and/or pot 14. This C-shaped design includes a vertical portion 28 having a height sufficient to define a controlled pouring gap, and wherein the horizontal top flange 26 contacts a top portion 12B of the lid 12 to maintain the predetermined pouring gap between the lid 12 and the pot 14 when the pot 14 is moved to the pouring position and liquid is flowing through the gap. The C-shaped design also includes a bottom curved portion 30 that extends in an inward direction with respect to the vertical portion 28 of the hook member 22 and the pot sidewall 20. A pair of opposed handle hinges 44 formed by tab 27 as shown in FIG. 1 is provided on the pot 14 for securing the bail handle 40 via flanges 29 to the opposed top edges 24 of the opposed sidewalls 20 of the pot 14. The flanges have holes 29' formed therethrough which align with venting holes (not shown) formed through the sidewall 20 of the pot 14 to receive rivets therethrough for securing the flanges 29 to the pot 14.

Figure 2A:
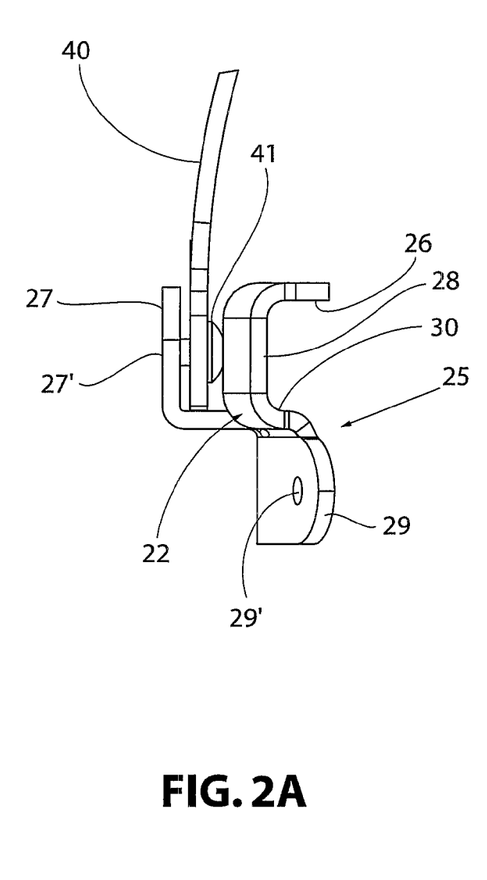
FIG. 2A is a side perspective view of a portion of the handle and the device of FIG. 1 in accordance with an embodiment of the present invention.
Figure 2B:
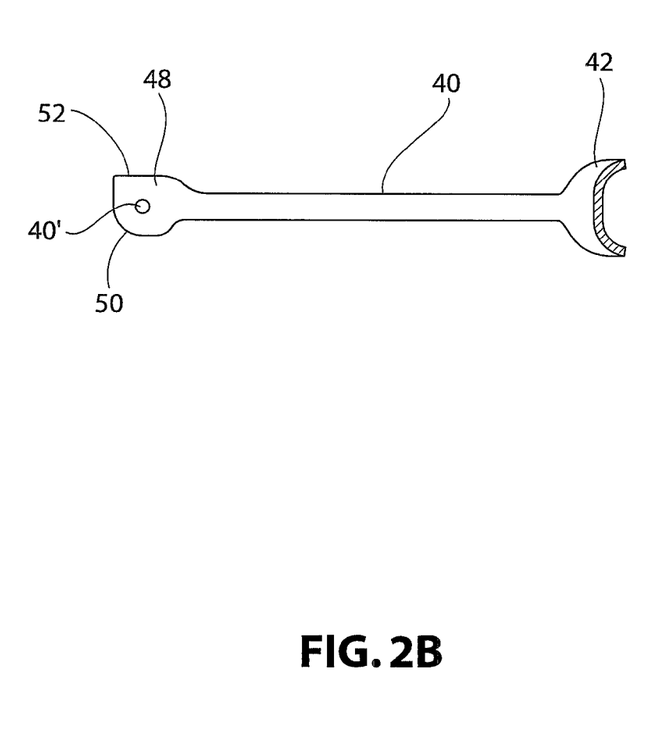
FIG. 2B is a side elevation sectional view of the handle of FIG. 1 in accordance with an embodiment of the present invention.
Figure 4:
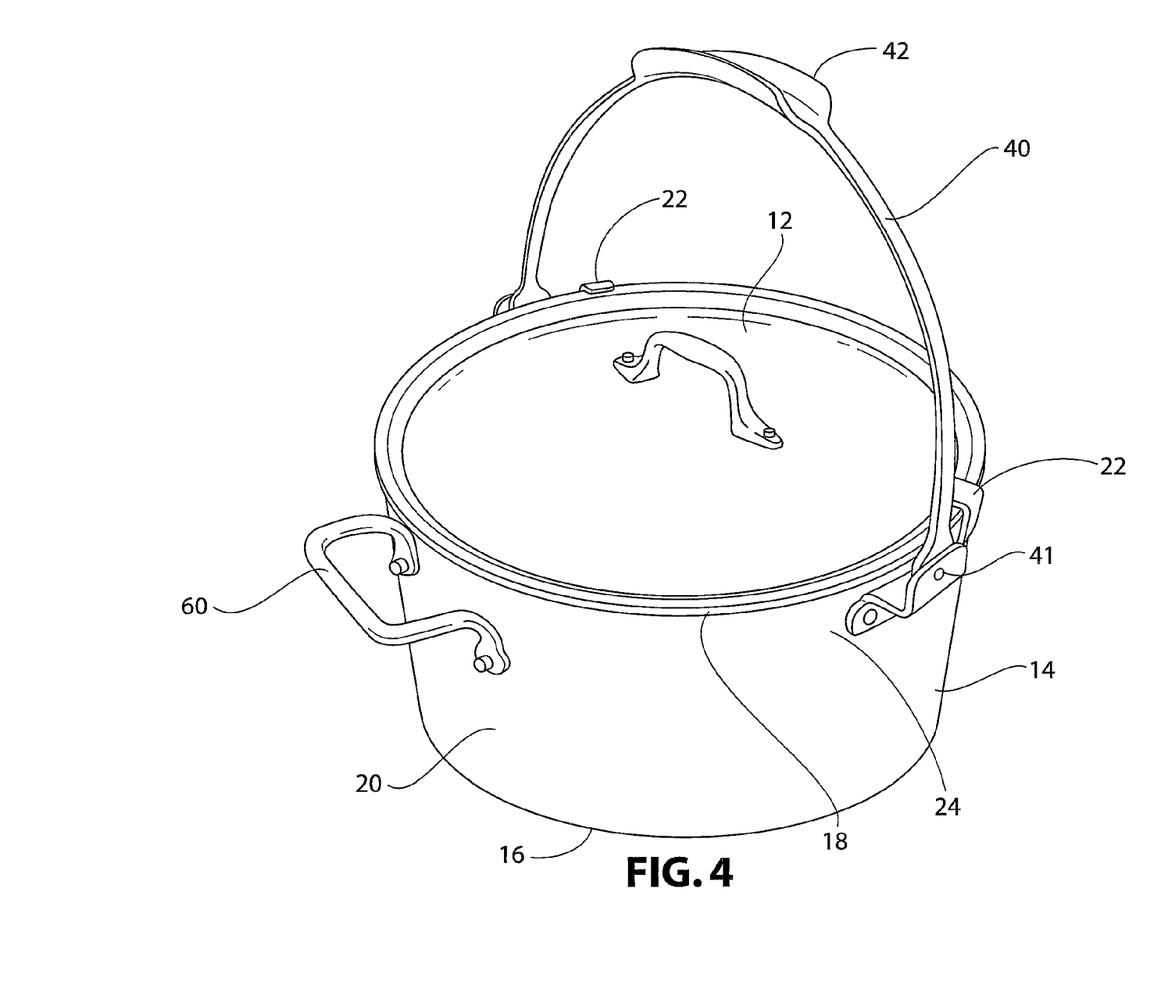
FIG. 4 is a top side perspective view of the pot, handle and device of FIG. 3 in accordance with an embodiment of the present invention.
Figure 5A:
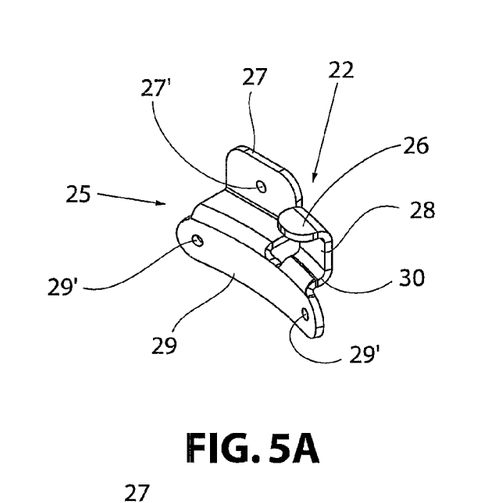
FIG. 5A is a top perspective view of the handle hinge and holding device of FIG. 1 in accordance with an embodiment of the present invention.
Figure 5B:
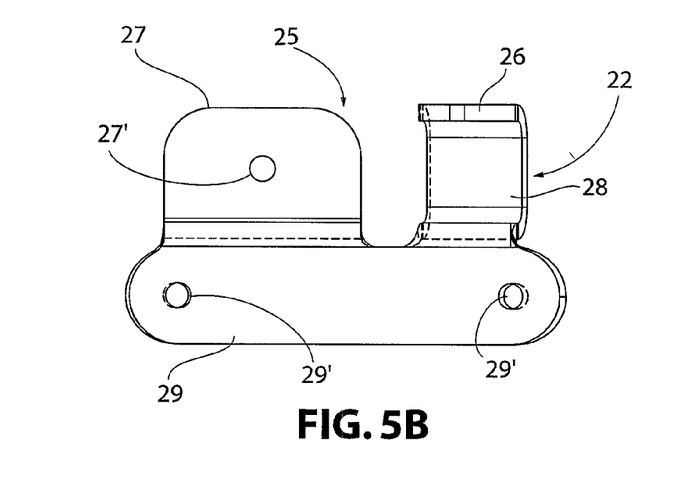
FIG. 5B is a side elevation view of the handle hinge and holding device of FIG. 5A in accordance with an embodiment of the present invention.
Figure 5C:
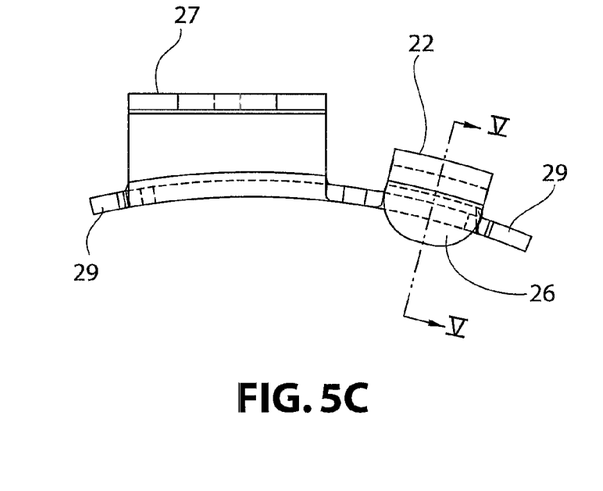
FIG. 5C is a top plan view of the handle hinge and holding device of FIG. 5A in accordance with an embodiment of the present invention.
Figure 5D:
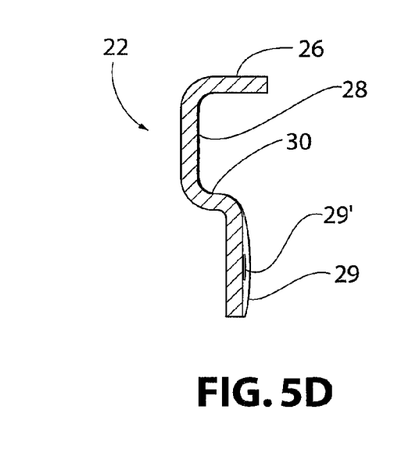
FIG. 5D is a sectional view of the holding device taken along line V-V of FIG. 5C in accordance with an embodiment of the present invention.

With particular reference to FIGS. 1 and 2A-2B, according to one design, the handle hinges 44 can include a hinge ledge 46 for cooperating with opposed handle ends 48 wherein the handle ends 48 include a first radiused edge 50 and a second square edge 52 having an approximate 90° angle. The first edge 50 cooperates with the hinge ledge 46 to enable the handle 40 to pivot in a first direction with respect to the pot 14. The second edge 52 cooperates with the hinge ledge 46 to form a stop to prevent the handle 40 from pivoting in a second direction with respect to the pot 14. This provides an added safety feature as this stop limits the pivotal rotation of the bail handle to 90° and thus, the handle 40 cannot over-rotate and risk spilling the pot contents onto the user. According to one embodiment, the hook members 22 can be integrally formed with the handle hinges 44. The pot 14 can include a second handle 60, as seen in FIG. 4, positioned on the sidewall portion 20 thereof to assist the user with manipulation of the pot 14 during pouring. According to one design, the bail handle 40 can be positioned off-set from the centerline "CL" of the pot in an amount of approximately 0.25 inches toward the pouring edge of the pot.

Figure 6A:
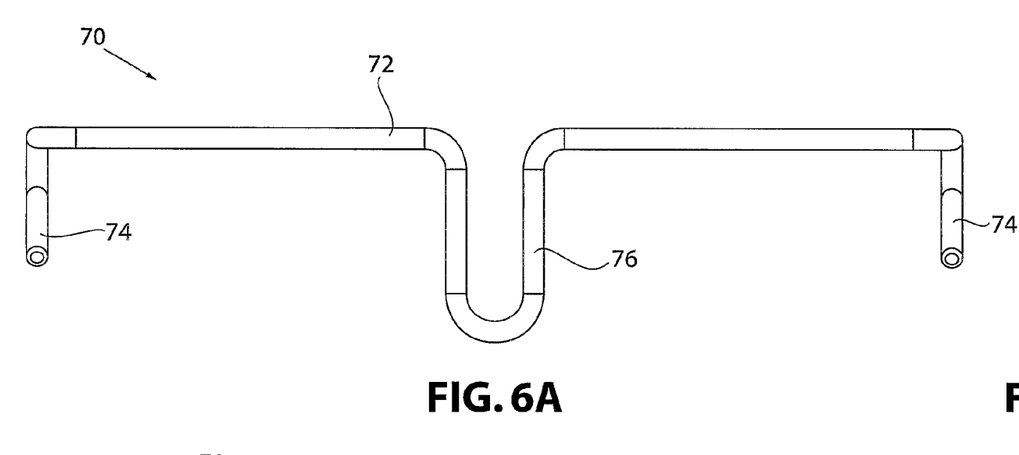
FIG. 6A is a top plan view of a device for holding a lid to a pot in accordance with another embodiment of the present invention.
Figure 6B:
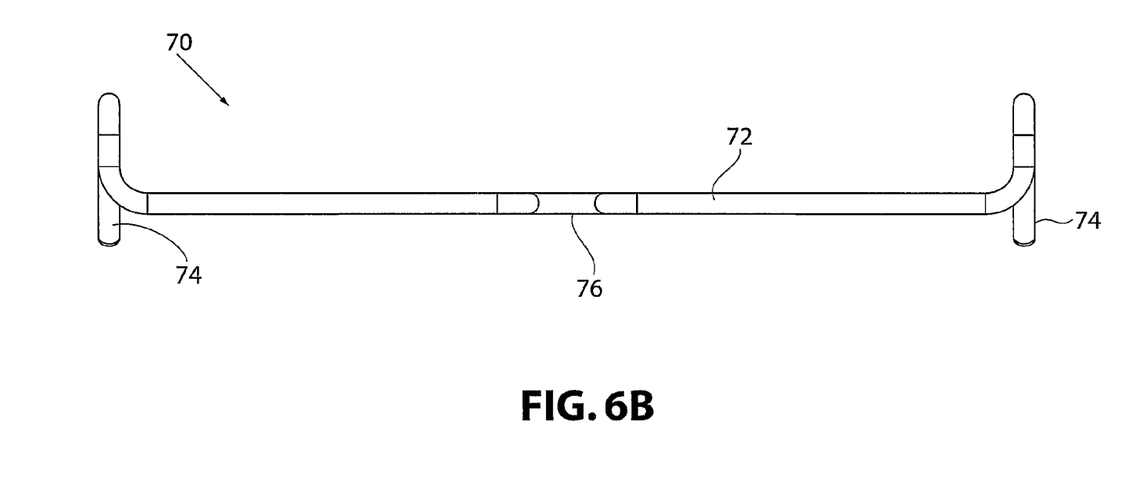
FIG. 6B is a front elevation view of the device of FIG. 6A in accordance with an embodiment of the present invention.
Figure 6C:
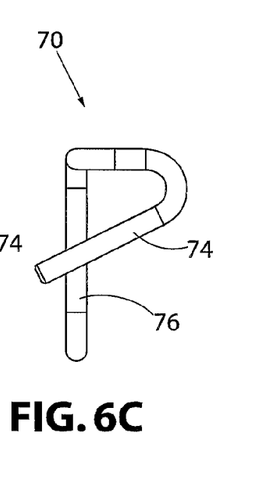
FIG. 6C is a side elevation view of the device of FIG. 6A in accordance with an embodiment of the present invention.

Reference is now made to FIGS. 6A-6C which show a device, generally indicated as 70, for holding a lid 12 to a pot 14 as illustrated in FIGS. 3-4, according to another embodiment of the present invention to permit the pouring or straining of liquid from the pot while retaining a food product within the pot. The device 70 is preferably formed in one piece from stainless steel wire of about 5 mm inch diameter and comprises an elongated member 72 having opposed hook members 74 configured for cooperating with opposed handle ends 48 pivotally attached to opposed top edges 24 of the sidewalls 20 of the pot 14 such that the elongated member 72 extends across a top portion of the lid 12. The opposed handle ends 48 are located off-set from a centerline "CL" of the pot as discussed above and shown in FIG. 1. The elongated member 72 includes a U-shaped member 76 that extends in a lateral direction with respect to the elongated member 72 and is configured for contacting the lid 12, whereby when the pot 14 is moved to a pouring position, the liquid forces the lid 12 to separate from the pot 14 and the U-shaped laterally extending member 76 engages the lid 12 to maintain a predetermined pouring gap between the lid 12 and the pot 14 and also to prevent the lid 12 from sliding forward off the pot 14 due to its off-set positioning from the pot centerline "CL".

The present invention has been described with reference to the preferred embodiments. Obvious modifications and alterations will occur to others upon reading and understanding the preceding detailed description. It is intended that the invention be construed as including all such modifications and alterations.

The invention claimed is:

1. An assembly for holding a lid to a pot to permit the pouring of liquid from the pot while retaining a food product within the pot, said assembly comprising the pot, the lid for enclosing an open top end of the pot, a pair of spaced apart hook members configured to be attached to opposed top edges of the pot and positioned off-set from a centerline of the open top end of the pot toward a pouring edge of the pot, said hook members each including a horizontal top flange turned inwardly toward the pot, and a bail handle pivotally attached to opposed sidewalls of the pot and positioned off-set from the centerline of the open top end of the pot toward the pouring edge of the pot to provide a preferential pouring orientation for the pot, whereby when the pot is moved to a pouring position, the liquid forces the lid to separate from the pot and the top flanges of the hook members to engage the lid to maintain a predetermined pouring gap between the lid and the pot and also to prevent the lid from sliding forward off the pot due to their off-set positioning from the pot centerline, wherein the bail handle is pivotally movable relative to the pot independently of the pair of spaced apart hook members.

2. The assembly of claim 1, wherein the spaced apart hook members define a diameter which is less than a pot diameter and a lid diameter so as to prevent the lid from sliding forward off the pot when the pot is positioned in the preferential pouring orientation.

3. The assembly of claim 1, wherein the bail handle is positioned off-set from the centerline of the pot in an amount of approximately 0.25 inches.

4. The assembly of claim 1, wherein the spaced apart hook members have a C-shaped design configured for receiving an edge portion of the lid, said C-shaped design including a vertical portion having a height sufficient to define the predetermined pouring gap, and wherein the horizontal top flange contacts a top portion of the lid to maintain the predetermined pouring gap between the lid and the pot when the pot is moved to the pouring position and liquid is flowing through the gap.

5. The assembly of claim 1, wherein the spaced apart hook members are secured to opposed sidewalls of the pot.

6. The assembly of claim 1, including a pair of opposed handle hinges for securing the bail handle to the opposed sidewalls of the pot, said handle hinges including a ledge for cooperating with opposed handle ends wherein the handle ends include a first radiused edge and a second square edge wherein the first edge cooperates with the hinge ledge to enable the handle to pivot in a first direction with respect to the pot, and the second edge cooperates with the hinge ledge to form a stop to prevent the handle from pivoting in a second direction with respect to the pot.

7. The assembly of claim 6, wherein the bail handle has a 90° pivotal rotation limit.

8. The assembly of claim 6, wherein the hook members are integrally formed with the handle hinges.

9. The assembly of claim 6, wherein the pot includes a second handle positioned on a sidewall portion thereof to assist a user to manipulate the pot during pouring.

10. The assembly of claim 1, wherein the spaced apart hook members define a diameter D1 which is less than a pot diameter and a lid diameter D2.

11. An assembly for holding a lid to a pot to permit the pouring of liquid from the pot while retaining a food product within the pot, said assembly comprising the pot, the lid for enclosing an open top end of the pot, an elongated member having opposed hook members configured for cooperating with opposed handle ends pivotally attached to opposed sidewalls of the pot such that said elongated member extends across a top portion of the lid, said opposed hook members being located off-set from a centerline of the open top end of the pot toward a pouring edge of the pot, said elongated member including a laterally extending member configured for contacting the lid, and a bail handle pivotally attached to opposed sidewalls of the pot and positioned off-set from the centerline of the open top end of the pot toward the pouring edge of the pot to provide a preferential pouring orientation for the pot, whereby when the pot is moved to a pouring position, the liquid forces the lid to separate from the pot and the laterally extending member engages the lid to maintain a predetermined pouring gap between the lid and the pot and also to prevent the lid from sliding forward off the pot due to its off-set positioning from the pot centerline, wherein the bail handle is pivotally movable relative to the pot independently of the elongated member having opposed hook members.

* * * * *

UNITED STATES PATENT AND TRADEMARK OFFICE
CERTIFICATE OF CORRECTION

PATENT NO. : 9,756,979 B2  
APPLICATION NO. : 13/646772  
DATED : September 12, 2017  
INVENTOR(S) : William A. Groll

Page 1 of 1

It is certified that error appears in the above-identified patent and that said Letters Patent is hereby corrected as shown below:

On the Title Page

Column 1, Item (71), Applicant, Line 2, delete "Cannonsburg" and insert -- Canonsburg --

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*